3,404,142
PRECIPITATION OF PROTEINS FROM WHEY USING SODIUM ALGINATE
Joseph L. Shank, Matteson, Ill., and William H. Cunningham, St. Louis, Mo., assignors to Swift & Company, Chicago, Ill., a corporation of Illinois
No Drawing. Filed June 17, 1965, Ser. No. 464,870
6 Claims. (Cl. 260—112)

ABSTRACT OF THE DISCLOSURE

Method of separating proteins from whey solution comprising treating an acidified whey solution with a polysaccharide whereby the polysaccharide and proteins co-precipitate from the solution.

---

The present invention relates to a method for precipitating proteins. More specifically, the present invention contemplates the co-precipitation of proteins from whey with a polysaccharide, or vegetable gum.

Dairy processes at the present time produce large quantities of whey as a by-product. For example, nine pounds of whey are produced in the preparation of one pound of cheese. Although this by-product contains valuable proteins, it has been of little commercial use due to the difficulty of separating the protein from the other constituents of the whey.

Conversely, a disposal problem has been created due to the high B.O.D., i.e., biochemical oxygen demand, of the whey, since presence of the high B.O.D. prevents effective use of normal sewage disposal means.

Prior methods for separating proteins from whey have met with only limited success. These prior methods may be grouped into the following three major categories: (1) coagulation of the protein with heat, (2) saturation of the whey with salts, diluting and acidifying the solution, and subsequently recrystalling the protein; and (3) precipitation of the protein with a mineral acid and heat. All of these prior methods are disadvantageous in that they are time consuming, costly, and produce low yields of protein. In addition, two of the above methods result in a denatured protein.

It is therefore evident that it would be desirable to recover a major amount of protein from whey solutions by a method which would be rapid, economical and which would result in an undenatured protein product.

Thus, it is an object of the present invention to provide an improved method of separating proteins from whey without denaturing the protein.

It is another object to provide an improved method of separating protein from whey which will be both rapid and economical.

It is another object to separate protein from whey by co-precipitation with a polysaccharide, or vegetable gum.

It is another object to accomplish precipitation of proteins from whey without the necessity of applying heat.

Other objects of the present invention will be apparent from the reading of the following description and examples.

Generally, the present invention comprises the separation of proteins from whey by co-precipitation with a polysaccharide, or vegetable gum.

In the method contemplated by the present invention, whey, which has a normal pH of about 6, is adjusted to an alkaline pH by addition of a base, such as NaOH. An amount of a polysaccharide is then thoroughly dissolved in the whey solution. After thorough mixing, the solution is acidified and allowed to stand until a co-precipitate of the polysaccharide and protein develops. The precipitate may then be separated from this solution by conventional means.

The polysaccharide found most effective in the present invention is sodium alginate. The use of carragheen as the polysaccharide in the present invention has also been found to be effective. Various other saccharides, such as carboxymethylcellulose, gum karaya and gum arabic were also found to be of some limited value, but did not yield the preferred results obtained with the use of sodium alginate.

Protein precipitation by this method is effective using a wide variation in the percentage of polysaccharide to whey. From a commercial standpoint, however, a polysaccharide content of from about 400 p.p.m. to about 0.2% based on the weight of the whey, has been found to be most satisfactory.

The polysaccharide may be used in solution or in solid form. Although both methods are equally effective, the resulting volume of the liquid is naturally minimized by using polysaccharide in solid form.

As previously mentioned, the pH of the whey solution is adjusted to the alkaline range prior to addition of the polysaccharide. In this respect, a pH of about 9 is preferred, although a pH range of from about 6 to about 12 may be employed. Sodium hydroxide is ordinarily used in this pH adjustment, although suitable equivalents, such as potassium hydroxide, will be readily obvious to one skilled in the art.

In order to accomplish the most effective precipitation of the proteins, it is preferred that the pH of the whey be reduced to about 3 or less after the saccharide has been added. A higher pH, although somewhat effective, results in a lower yield of protein. A pH lower than 3 is also suitable, but obviously results in an increased cost due to the additional acid used. Hydrochloric acid is commonly employed in adjusting to the acid pH range. However, other food grade acids are also suitable for this purpose.

As opposed to most prior methods, the present method may be conducted at about room temperature. However, a temperature somewhat above or below room temperature may be employed. Care should be taken, however, not to heat the solution as high as the temperature at which the protein is denatured. It is thus evident from this temperature range that the present method permits separation of the protein from the whey without denaturization of the protein.

The protein product obtained by the present method may be employed as a stabilizer in ice cream and various other instances where a cheap, nourishing protein is desired.

The following examples are given as illustrative of the present method and are not to be considered as restrictive of the invention.

Example I

Whey, resulting from the preparation of cottage cheese was pasteurized and cooled to room temperature. The pH was then adjusted from the initial pH 6 to pH 9 by adding concentrated NaOH and agitating. Powdered sodium alginate in the amount of 0.2% by weight was then added to the whey and allowed to dissolve. The pH of the resultant solution was then adjusted to pH 3 by the addition of concentrated HCl. After the formation of the precipitate (about 20 minutes) the precipitate was collected by centrifugation in a Fletcher Standard Centrifuge at 2100 r.p.m. The protein yield was about 1.0% based on the total weight of the whey.

Example II

The procedure of Example I was repeated using carragheen instead of sodium alginate. The protein yield was about 0.4% based on the total weight of the whey. Boiling of the supernatant liquid resulted in some coagulation indicating that not all of the protein had precipitated.

Obviously, many modifications and variations of the invention hereinbefore set forth may be made without departing from the spirit and scope thereof, and therefore only such limitations should be imposed as are indicated in the appended claims.

We claim:

1. A method for precipitating proteins from cheese whey comprising: adjusting the pH of cheese whey to an alkaline pH, mixing sodium alginate with said whey, and acidifying the solution thus formed.

2. A method for precipitating proteins from cheese whey comprising: adjusting the pH of cheese whey to an alkaline pH, mixing sodium alginate with said whey, acidifying the solution thus formed, and holding the solution until a co-precipitate of protein and sodium alginate is formed.

3. The method of claim 2 wherein the sodium alginate is in solid form.

4. A method for precipitating proteins from whey comprising: adjusting the pH of whey to a pH range of about 8 to about 12, mixing sodium alginate with said whey, lowering the pH of the solution thus formed to up to about pH 3, holding the solution until a co-precipitate of protein and sodium alginate is formed, and separating said co-precipitate from the remainder of said solution.

5. A method for precipitating proteins from whey comprising: adjusting the pH of whey to a pH of about 9, mixing sodium alginate with said whey, lowering the pH of the solution thus formed to up to about pH 3, holding the solution until a co-precipitate of protein and sodium alginate is formed, and separating said co-precipitate from the remainder of said solution.

6. A method for precipitating proteins from whey comprising: adjusting the pH of whey to a pH of about 9, mixing sodium alginate in the amount of about 400 p.p.m. to about 0.2% based on the weight of whey with said whey, lowering the pH of the solution thus formed to up to about pH 3, holding the solution until a co-precipitate of protein and sodium alginate is formed, and separating said co-precipitate from the remainder of said solution.

References Cited

UNITED STATES PATENTS

| 1,732,026 | 10/1929 | Pohlmann et al. | 99—57 X |
| 3,069,327 | 12/1962 | Eldridge et al. | 195—63 |
| 3,094,517 | 6/1963 | Stanley | 260—209 |

FOREIGN PATENTS

| 947,976 | 1/1964 | Great Britain. |

OTHER REFERENCES

J. of Dairy Science, vol. 45, 1962, Tarassuk et al., pp. 253–257.

J. of Dairy Science, vol. 44, 1961, Carroll, pp. 2194–2201.

WILLIAM H. SHORT, *Primary Examiner.*

H. SCHAIN, *Assistant Examiner.*